US009415315B2

(12) United States Patent
Suto et al.

(10) Patent No.: US 9,415,315 B2
(45) Date of Patent: Aug. 16, 2016

(54) GAME SYSTEM, GAME APPARATUS, GAME PROCESSING METHOD, AND RECORDING MEDIUM

(71) Applicant: NINTENDO CO., LTD., Kyoto (JP)

(72) Inventors: Fumiya Suto, Kyoto (JP); Keizo Ohta, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 347 days.

(21) Appl. No.: 13/913,838

(22) Filed: Jun. 10, 2013

(65) Prior Publication Data

US 2014/0221085 A1    Aug. 7, 2014

(30) Foreign Application Priority Data

Feb. 4, 2013    (JP) .................................. 2013-19796

(51) Int. Cl.
| A63F 13/87 | (2014.01) |
| A63F 13/53 | (2014.01) |
| A63F 13/424 | (2014.01) |
| A63F 13/803 | (2014.01) |
| A63F 13/332 | (2014.01) |

(52) U.S. Cl.
CPC .............. *A63F 13/87* (2014.09); *A63F 13/424* (2014.09); *A63F 13/53* (2014.09); *A63F 13/332* (2014.09); *A63F 13/803* (2014.09)

(58) Field of Classification Search
CPC ....... A63F 13/12; A63F 13/87; A63F 13/424; A63F 13/53; A63F 13/803; A63F 13/332; A63F 2300/572
See application file for complete search history.

(56) References Cited

U.S. PATENT DOCUMENTS 7,386,799 B1 *   6/2008   Clanton et al. ................ 715/758
2006/0025214 A1 *   2/2006   Smith ............................. 463/30

OTHER PUBLICATIONS

"Pocket Monsters Black—Operation Manual", with partial English translation, 2010, 4 pages.

* cited by examiner

*Primary Examiner* — Jasson Yoo
(74) *Attorney, Agent, or Firm* — Nixon & Vanderhye PC

(57) ABSTRACT

An example system includes a plurality of communication terminal devices each provided with: an environmental information acquisition part acquiring information concerning a surrounding environment; a communication data generating part, on the basis of the acquired environmental information, generating communication data having a smaller data amount than the environmental information; a transmitting part transmitting the generated communication data; a receiving part receiving communication data transmitted by another communication terminal device; an image generating part generating an image on the basis of the received communication data; and a display processing part performing processing of displaying the generated image in a manner of being related to a player participating in the game.

27 Claims, 10 Drawing Sheets

GAME SYSTEM, GAME APPARATUS, GAME PROCESSING METHOD, AND RECORDING MEDIUM

CROSS-REFERENCE TO RELATED APPLICATIONS

This application is based upon and claims the benefit of priority of the prior Japanese Patent Application No. 2013-19796, filed on Feb. 4, 2013, the entire contents of which are incorporated herein by reference.

FIELD

The present technique relates to a game system, a game apparatus, a game processing method, and a recording medium performing processing concerning a game participated by a plurality of players through a network.

BACKGROUND AND SUMMARY

In certain games participated by a plurality of players through a network, a chat function is provided for realizing communication between the players. Each player performs communication through the chat function and is thereby allowed to enjoy the game while feeling the presence of other players through the network. Presently employed chat functions include: transmitting and receiving text information inputted by a player; and acquiring, through a microphone, sound information concerning the utterance of a player and then transmitting and receiving the information.

According to an aspect of the embodiment, a game system is constructed from a plurality of communication terminal devices transmitting and receiving information and thereby performing processing concerning a game participated by a plurality of players, wherein each of the communication terminal devices includes an environmental information acquisition part acquiring information concerning a surrounding environment; a communication data generating part, on the basis of the environmental information acquired by the environmental information acquisition part, generating communication data having a smaller data amount than the environmental information; a transmitting part transmitting the communication data generated by the communication data generating part; a receiving part receiving communication data transmitted by other communication terminal devices; an image generating part generating an image on the basis of the communication data received by the receiving part; and a display processing part performing processing of displaying the image generated by the image generating part, onto a display part in a manner of being related to a player participating in the game.

The object and advantages of the invention will be realized and attained by means of the elements and combinations particularly pointed out in the claims. It is to be understood that both the foregoing general description and the following detailed description are exemplary and explanatory and are not restrictive of the invention.

This and other purposes, features, aspects, and effects of the present technique will become clearer from the following detailed description given with respect to the accompanying drawings.

DETAILED DESCRIPTION OF NON-LIMITING EXAMPLE EMBODIMENTS

Figure 1:
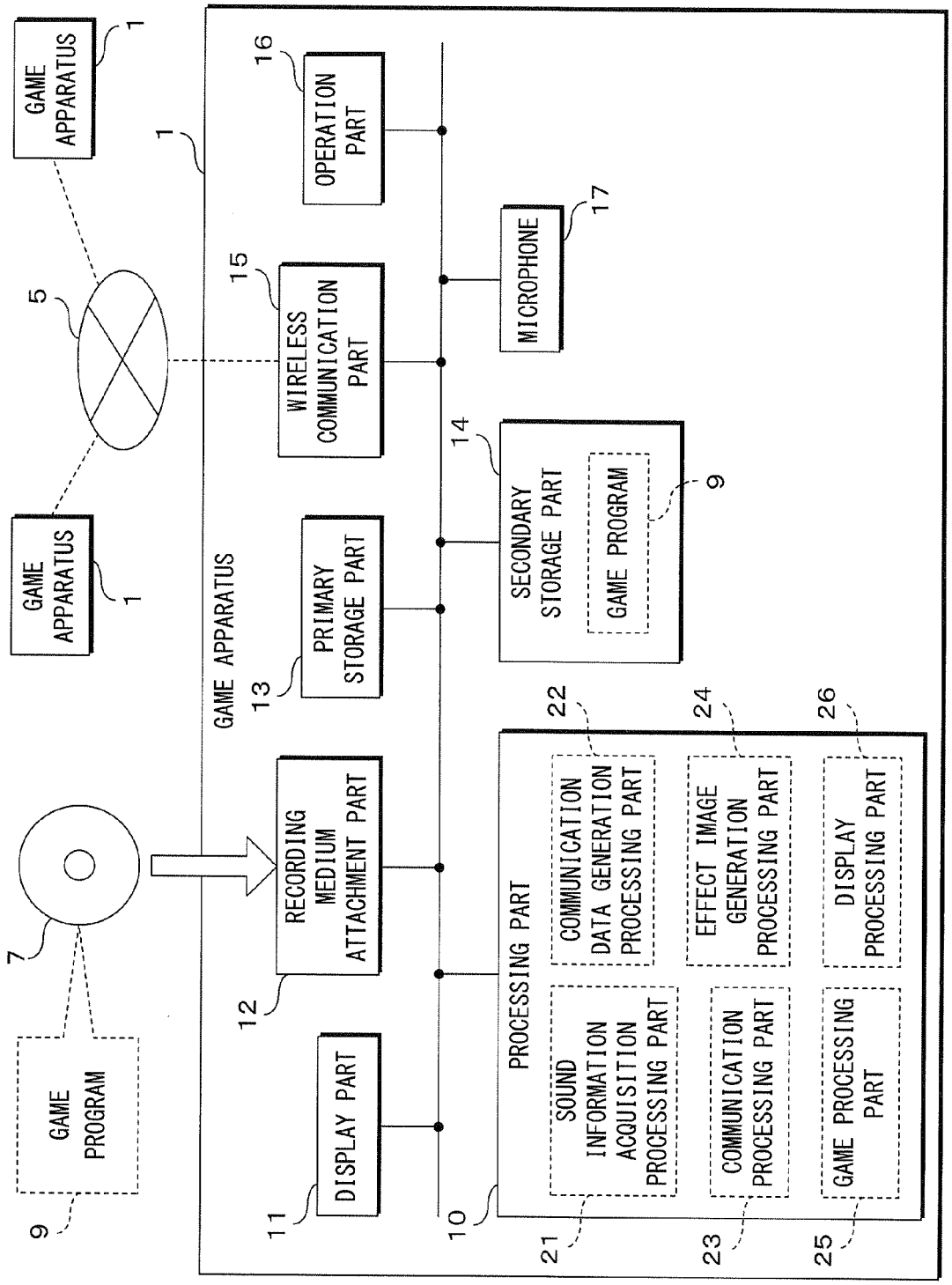
FIG. 1 shows an example non-limiting block diagram of a configuration of a game system according to an embodiment.

FIG. 1 illustrates an example block diagram of a configuration of a game system according to an embodiment. In the game system according to the present embodiment, a plurality of portable game apparatuses 1 having a wireless communication function transmit and receive information to and from each other through a network 5. By virtue of this, the game system realizes a game participated by a plurality of players. The present embodiment is described for a configuration that the game apparatuses 1 are of portable type. However, the game apparatuses may have another configuration of floor-standing type and the like. Further, the game system may be constructed from the game apparatuses 1 having mutually different configurations.

Each game apparatus 1 includes a processing part 10, a display part 11, a recording medium attachment part 12, a primary storage part 13, a secondary storage part 14, a wireless communication part 15, an operation part 16, and a microphone 17. The processing part 10 of the game apparatus 1 is constructed from an arithmetic processing unit such as a CPU (Central Processing Unit). The processing part 10 reads onto the primary storage part 13 a game program 9 stored in the secondary storage part 14 or a game program 9 recorded in a recording medium 7 attached to the recording medium attachment part 12, and then executes the program. By virtue of this, the processing part 10 performs various kinds of information processing concerning the game. For example, the processing part 10 performs the processing of generating information for communication on the basis of sound information acquired through the microphone 17. For example, the processing part 10 performs the processing of generating an effect image on the basis of received information. For example, in response to a accepted input operation or an event in the game, the processing part 10 performs the processing of generating a game image to be displayed on the display part 11.

For example, the display part 11 is constructed from a liquid crystal panel. The display part 11 displays the image provided from the processing part 10. The recording medium attachment part 12 is constructed such that a recording medium 7 of disk type, card type, or the like is allowed to be attached thereto and detached therefrom. The processing part 10 is allowed to read the game program 9 or other data from the recording medium 7 attached to the recording medium attachment part 12. The primary storage part 13 is constructed from a semiconductor memory device or the like. The primary storage part 13 temporarily stores various kinds of data generated in association with arithmetic processing of the processing part 10. The secondary storage part 14 is constructed from a nonvolatile storage device having a larger capacity than the primary storage part 13. The secondary storage part 14 stores the game program 9, other data and the like.

The wireless communication part 15 transmits and receives data to and from other game apparatuses 1, a server apparatus or the like through the network 5 such as a wireless LAN (Local Area Network) and a portable telephone network. For example, the game apparatus 1 performs communication with the server apparatus through the wireless communication part 15 so as to download the game program 9. The game apparatus 1 is allowed to store the downloaded game program 9 into the secondary storage part 14. The operation part 16 has cross keys, an analog stick, push buttons, a touch panel, or the like. The operation part 16 accepts an operation input from the player and then reports the operation input to the processing part 10. The microphone 17 acquires sound in the surroundings of the game apparatus 1 and then provides a signal to the processing part 10. The microphone 17 acquires, for example, uttered voice and the like of the player.

In the game apparatus 1, the processing part 10 executes the game program 9 so that an sound information acquisition processing part 21, a communication data generation processing part 22, a communication processing part 23, an effect image generation processing part 24, a game processing part 25, a display processing part 26, and the like are realized as software-based functional blocks. Here, a configuration may be employed that all or a part of the sound information acquisition processing part 21 to the display processing part 26 are realized as hardware-based functional blocks.

The sound information acquisition processing part 21 of the processing part 10 performs the processing of acquiring sound information of the surroundings of the game apparatus 1 through the microphone 17. The sound information acquisition processing part 21 performs sampling with a given period onto the sound provided from the microphone 17 and thereby acquires sound information. The sound information acquisition processing part 21 provides the acquired sound information to the communication data generation processing part 22. For example, the sound information acquisition processing part 21 acquires the sound information as data in the form of PCM (Pulse Code Modulation), AAC (Advanced Audio Coding) or the like.

On the basis of the sound information acquired by the sound information acquisition processing part 21, the communication data generation processing part 22 of the processing part 10 performs the processing of generating communication data to be transmitted to other game apparatuses 1. The communication data generation processing part 22 generates information indicating a change in the amplitude in the frequency domain for the provided sound information. By virtue of this, the communication data generation processing part 22 generates communication data having a smaller data amount than the sound information. The communication data generation processing part 22 provides the generated communication data to the communication processing part 23. The communication data generated by the communication data generation processing part 22 is provided as information concerning the own apparatus to the effect image generation processing part 24 also. In the present embodiment, the game apparatus 1 does not transmit to other game apparatuses 1 the sound information itself acquired by the sound information acquisition processing part 21. In the present embodiment, the communication data generated by the communication data generation processing part 22 has a different data format from that of the sound information provided from the sound information acquisition processing part 21.

The communication processing part 23 of the processing part 10 performs the processing of transmitting the communication data generated by the communication data generation processing part 22, to other game apparatuses 1 participating in the game. Further, the communication processing part 23 performs the processing of receiving the communication data transmitted by other game apparatuses 1. The communication processing part 23 adds information such as a header or footer to the communication data provided from the communication data generation processing part 22, and thereby generates information in a form suitable for the protocols of the wireless communication. The communication processing part 23 provides the generated information to the wireless communication part 15 so as to transmit the information to other game apparatuses 1. The communication processing part 23 receives through the wireless communication part 15 the information received from other game apparatuses 1. The communication processing part 23 extracts required information from the received information. The required information is, for example, communication data generated by the communication data generation processing part 22 of each of other game apparatuses 1. The communication processing part 23 provides to the effect image generation processing part 24 the information extracted from the received information. Here, the communication processing part 23 also performs the processing of transmitting and receiving other information necessary for the game.

The effect image generation processing part 24 of the processing part 10 performs the processing of generating an effect image to be displayed on the display part 11. The effect image generation processing part 24 generates this effect image on the basis of the communication data received from other game apparatuses 1 and the communication data concerning the own apparatus generated by the communication data generation processing part 22. In the present embodiment, the effect image generated by the effect image generation processing part 24 is an image varying in accordance with a change in the sound acquired through the microphone 17 in each game apparatus 1. The effect image generation processing part 24 generates one effect image for each game apparatus 1. The effect image generation processing part 24 provides the generated effect image to the display processing part 26.

The game processing part 25 of the processing part 10 performs the processing of accepting an input operation of a player inputted through the operation part 16. In accordance with the accepted input operation, the game processing part 25 performs various kinds of processing of object control, game judgment and the like related to the game. For example, in accordance with the input operation, the game processing part 25 generates movement, action or the like in a player object. For example, the game processing part 25 performs generation, arrangement, movement and the like of an object other than the player object. Objects other than the player object include an enemy object (an object which is not an operation target of the user), a background or obstacle object, and a field object in which these objects are arranged. For example, the game processing part 25 performs the processing of judging the success or failure of an action such as attack, evasion and the like of the player object performed in accordance with the input operation. For example, the game processing part 25 performs the processing of judging whether conditions of victory or defeat in the game have been satisfied. The game processing part 25 provides the result of such processing to the display processing part 26.

The display processing part 26 of the processing part 10 performs the processing of generating and displaying a game screen onto the display part 11. The display processing part 26 generates this game screen on the basis of the result of the game processing provided from the game processing part 25, the effect image provided from the effect image generation processing part 24 and the like. The display processing part 26 generates as a game image the image in which a plurality of objects arranged by the game processing part 25 are drawn. At that time, the display processing part 26 arranges respectively the effect images generated by the effect image generation processing part 24, in the vicinities of the plurality of player objects corresponding to each game apparatus 1 or each player participating in the game. The display processing part 26 provides the generated game image to the display part 11. As a result, the game screen is displayed on the display part 11.

Figure 2:
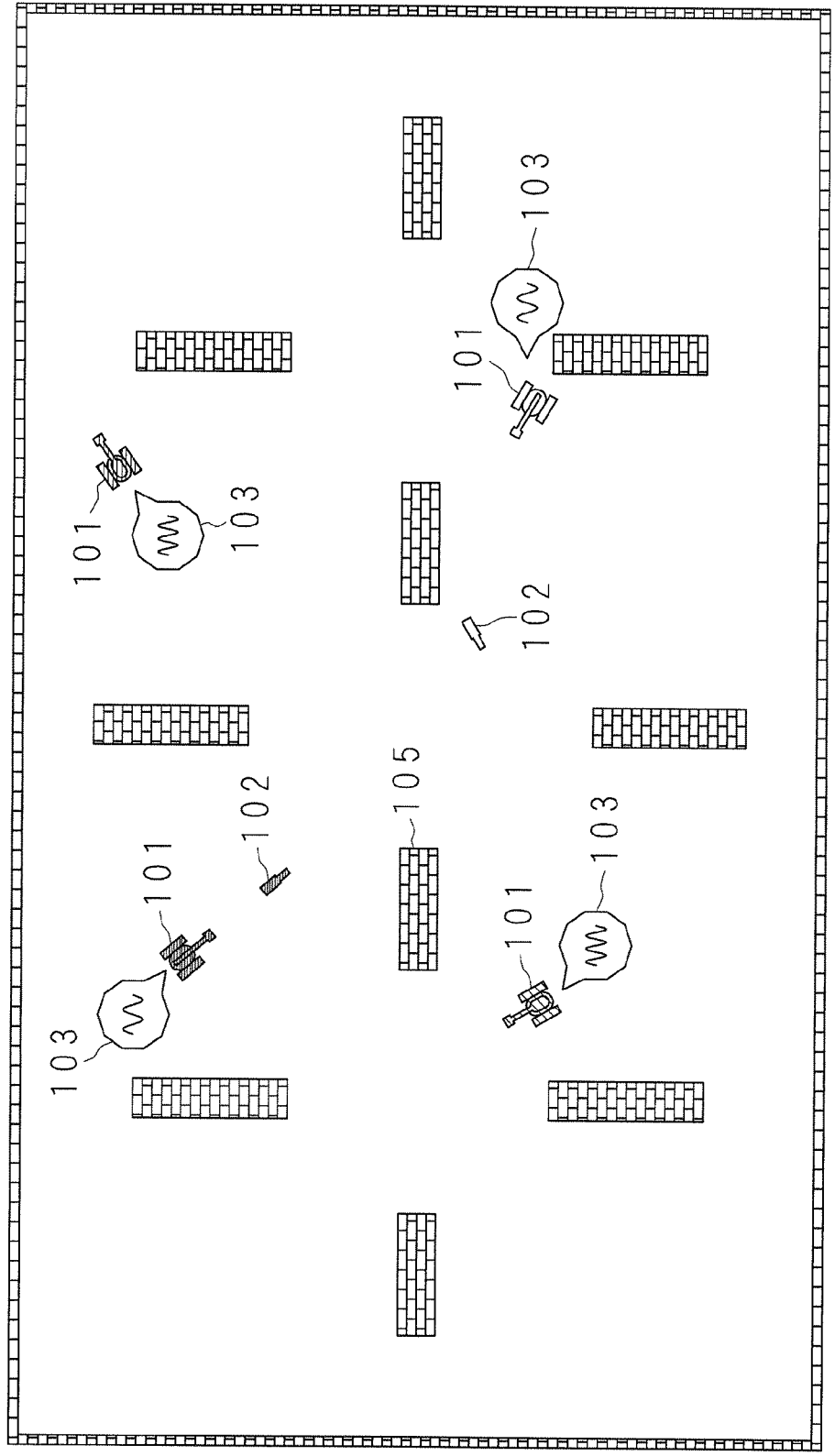
FIG. 2 shows an example non-limiting schematic diagram illustrating an example of a game screen displayed by a game program according to an embodiment.

Next, an example of a game performed by the game program 9 according to the present embodiment is described below. FIG. 2 is a schematic diagram illustrating an example of a game screen displayed by the game program 9 according to the present embodiment. In the game screen of the present example, four tank objects 101 serving as player objects and a plurality of obstacle objects 105 are arranged within a substantially rectangular field surrounded by four walls. The four tank objects 101 are colored differently from each other. Thus, the four tank objects 101 are distinguishable from each other in the game screen displayed on the display part 11. Here, in FIG. 2, different coloring is expressed by different shading.

Each of the four tank objects 101 is in one-to-one correspondence to each game apparatus 1 participating in the game. In the game of the present example, each of the plurality of players uses corresponding one of the game apparatuses 1. Then, each player operates one tank object 101 assigned to each game apparatus 1. After the game is started, each player operates one tank object 101 so as to attack the tank objects 101 operated by other players. The illustrated game screen expresses a state obtained after the game start. In this game screen, certain tank objects 101 perform attacking actions. For example, each player performs a moving operation for the tank object 101 by using the cross keys provided in the operation part 16 of the own game apparatus 1. For example, each player performs an attack (bombardment) operation by the tank object 101 by using a push button.

When the player has performed a bombardment operation, an artillery shell 102 is discharged from the tank object 101. The discharged artillery shell 102 travels in a particular direction. When the artillery shell 102 goes into contact with one of other tank objects 101, this tank object 101 is destroyed and hence is defeated in the present game. When the artillery shell 102 goes into contact with an obstacle object 105, the course of the artillery shell 102 is reflected at the point of contact with the obstacle object 105. Then, the artillery shell 102 travels in the direction of reflection. After discharged from the tank object 101, the artillery shell 102 continues traveling within the field until a given time such as 10 seconds elapses. The artillery shell 102 disappears after going into contact with one of other tank objects 101 or after the given time has passed. The players operate the individual tank objects 101 so as to attack each other. Then, a tank object 101 having remained to the end without being destroyed becomes the victory object in the game of the present example.

In the game of the present example, a speech balloon 103 is displayed in the vicinity of each tank object 101. The speech balloon 103 is in one-to-one correspondence to each tank object 101. That is, the speech balloon 103 is in one-to-one correspondence to each game apparatus 1 and each player operating the game apparatus 1. The speech balloon 103 is an image generated as an effect image by the effect image generation processing part 24 of the processing part 10. Each speech balloon 103 in the figure is a polygonal geometrical figure obtained by joining a plurality of vertices. Then, a waveform is illustrated inside. The speech balloon 103 is generated on the basis of sound information collected through the microphone 17 of each corresponding game apparatus 1. In the speech balloon 103, a change is made in the vertex positions of the polygon, the shape of the waveform inside and the like in accordance with a change in the sound information.

Figure 3:
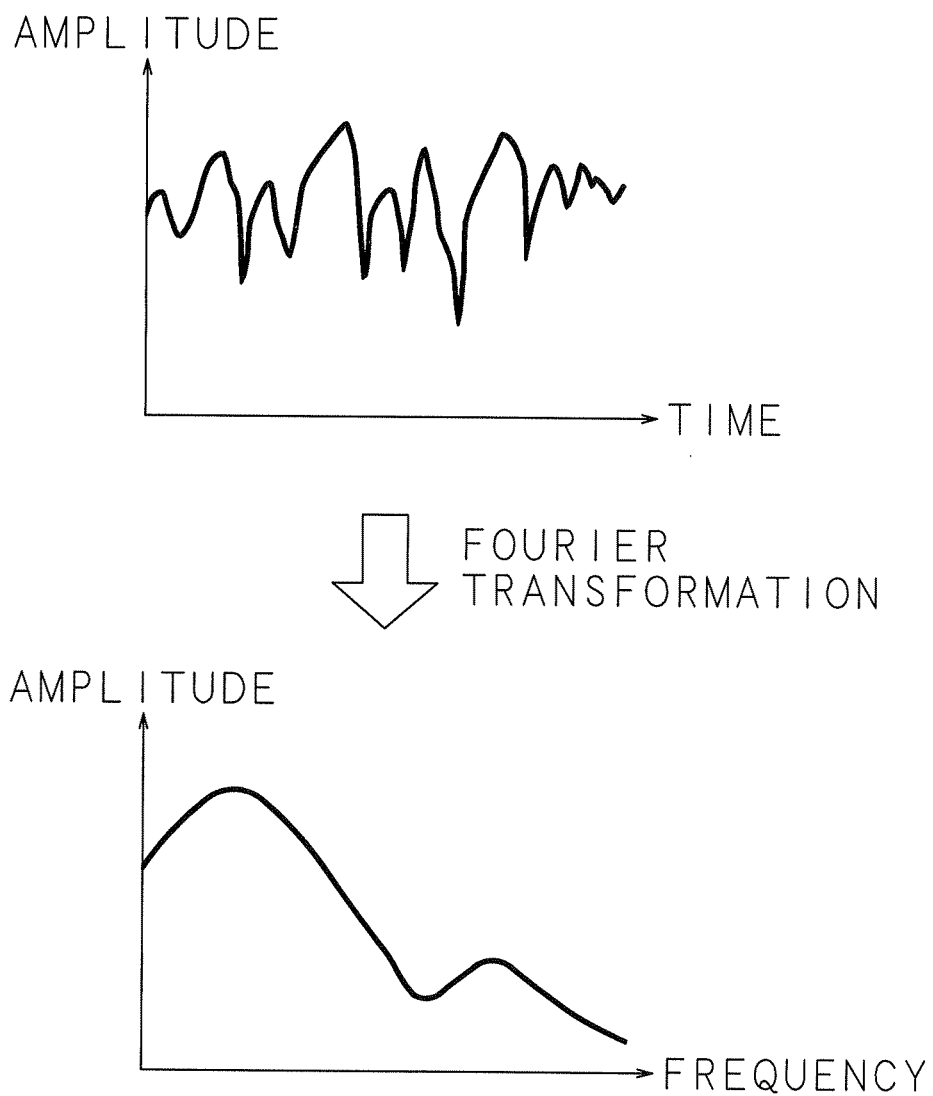
FIG. 3 shows an example non-limiting schematic diagram used for describing details of a generation method for a speech balloon.

FIGS. 3 to 8 are schematic diagrams used for describing details of a generation method for the speech balloon 103. In the processing part 10 of each game apparatus 1, the sound information acquisition processing part 21 repeats sampling of sound input through the microphone 17 with a given sampling period. The sound information acquisition processing part 21 provides sound information obtained by accumulating the sampling results for a given time, to the communication data generation processing part 22. The upper part of FIG. 3 illustrates an example of the sound information. The sound information acquired by the sound information acquisition processing part 21 may be expressed as amplitude-to-time characteristics. The communication data generation processing part 22 performs Fourier transformation on the provided sound information. By virtue of this, the communication data generation processing part 22 transforms the sound information expressed as amplitude-to-time characteristics into frequency components in the amplitude-to-frequency characteristics. The lower part of FIG. 3 illustrates an example of frequency components generated by Fourier transformation processing by the communication data generation processing part 22.

Figure 4:
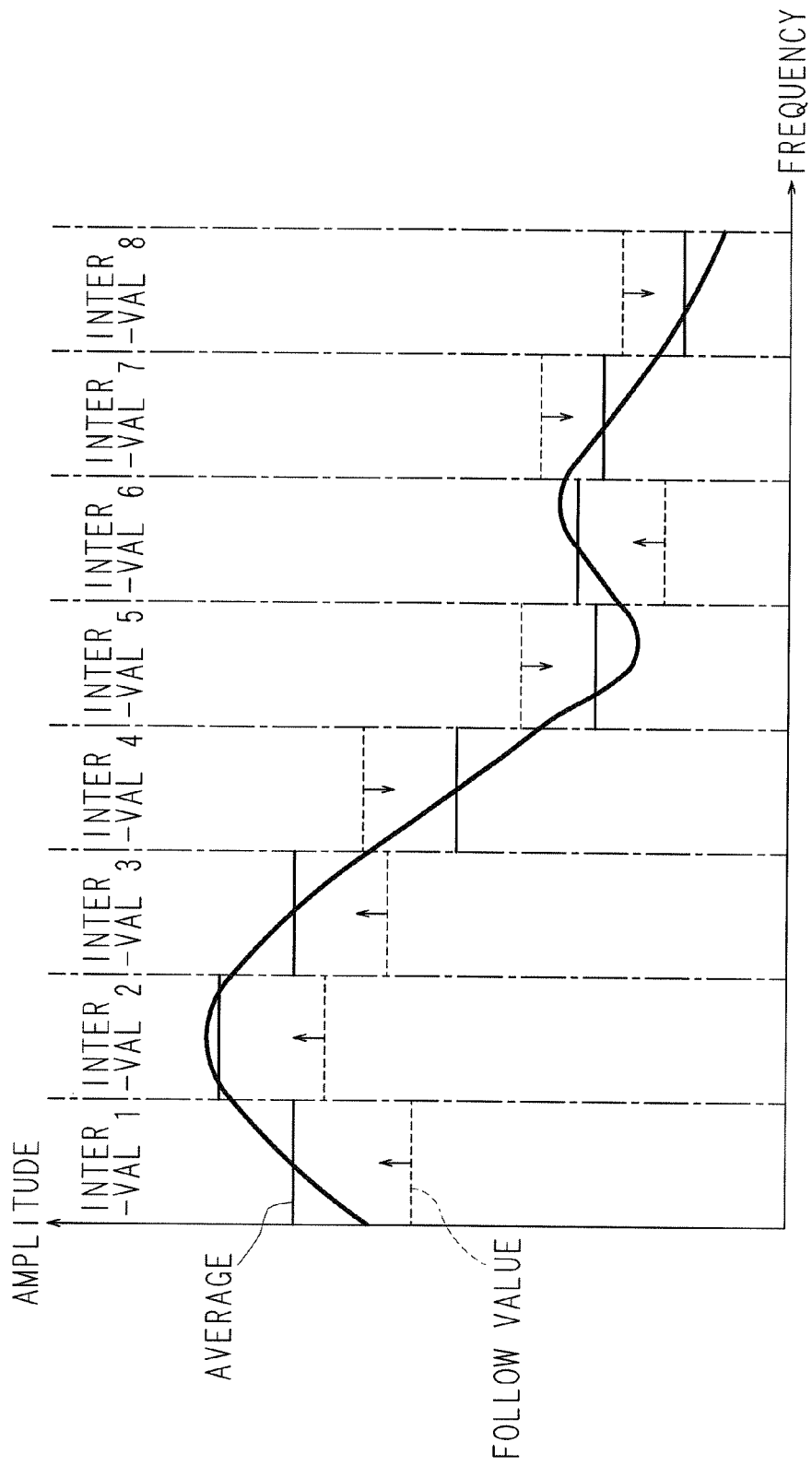
FIG. 4 shows an example non-limiting schematic diagram used for describing details of a generation method for a speech balloon.

The communication data generation processing part 22 divides into a plurality of frequency intervals the information of frequency components generated by Fourier transformation processing. FIG. 4 illustrates an example where the amplitude-to-frequency characteristics illustrated in the lower part of FIG. 3 are divided into eight frequency intervals 1 to 8. In the example in the figure, the intervals 1 to 8 have mutually equal widths. However, the intervals 1 to 8 may have different widths. The communication data generation processing part 22 calculates the average of the amplitude for each of the eight intervals 1 to 8. In FIG. 4, the average of the amplitude in each interval 1 to 8 is illustrated as a horizontal solid line. The communication data generation processing part 22 calculates a follow value that follows the average for each of the eight intervals 1 to 8. In FIG. 4, the follow value in each of the intervals 1 to 8 is illustrated as a horizontal dashed line, and the follow direction of each follow value is indicated by an arrow.

The sound information acquisition processing part 21 repeats the acquisition of sound information with a given period. Similarly, the communication data generation processing part 22 repeats the calculation of the average and the follow value of each of the intervals 1 to 8. In the first turn of this repeat, the communication data generation processing part 22 sets the follow value to be equal to the average at that time point. In the next and subsequent turns, the communication data generation processing part 22 calculates the average at that time point of each of the intervals 1 to 8 and then increases or decreases the preceding follow value by a given amount in a direction of causing the follow value to approach the average. For example, in a case that the preceding follow value is 100 and the present average is 150 and that a given increase or decrease value is 10, the communication data generation processing part 22 calculates the present follow value as 100+10=110. For example, in a case that the preceding follow value is 100 and the present average is 60 and that a given increase or decrease value is 10, the communication data generation processing part 22 calculates the present follow value as 100−10=90. Here, the amount of increase or decrease may be not fixed. For example, the amount of increase or decrease may be set to be 10% or the like of the difference between the average and the follow value. Alternatively, the amount of increase or decrease may be set to be 10% or the like of the average.

The communication data generation processing part 22 calculates the difference between the average and the follow value for each of the intervals 1 to 8, and then adopts the obtained value of difference as communication data. That is, the communication data of each of the intervals 1 to 8 is equal to the average minus the follow value. Here, in the present embodiment, when the calculated difference has a negative value, the communication data generation processing part 22 sets the communication data to be 0. That is, the communication data has a non-negative value. In such a configuration that no negative value is used as the communication data, the amount of data transmitted and received between the game apparatuses 1 is reduced and hence the load of processing in the downstream stages using the communication data is reduced.

In the game apparatus 1, the communication data generation processing part 22 generates eight pieces of communication data from the sound information acquired by the sound information acquisition processing part 21. Here, in the present embodiment, the game apparatus 1 transmits to other game apparatuses 1 only one of the eight pieces of communication data generated by the communication data generation processing part 22, and does not transmit the other seven pieces. The communication data generation processing part 22 selects one from the eight pieces of communication data and then provides it to the communication processing part 23 so as to perform transmission to other game apparatuses 1. At that time, the communication data generation processing part 22 selects and transmits the communication data in a given order like interval 1→interval 2→ . . . →interval 8→interval 1. Thus, for the sound information of one turn acquired by the sound information acquisition processing part 21, the communication data of one interval alone is transmitted to other game apparatuses 1. Thus, when the communication data generation processing part 22 has processed the sound information of eight turns, the communication data of all intervals is transmitted to other game apparatuses 1. Here, the communication data generation processing part 22 need not generate the communication data of all eight intervals in response to the sound information of one turn. A configuration may be employed that the communication data generation processing part 22 generates the communication data of necessary one interval alone. Another configuration may be employed that the communication data generation processing part 22 collects the differences of a plurality of intervals (two intervals to eight intervals) into one piece of communication data and then transmits the communication data to other game apparatuses 1.

The communication processing part 23 transmits the communication data of one interval generated by the communication data generation processing part 22, to other game apparatuses 1 participating in the game. Further, the communication processing part 23 receives the communication data of one interval transmitted by other game apparatuses 1, and then provides the data to the effect image generation processing part 24. Further, the communication data generation processing part 22 transmits to the effect image generation processing part 24 the same communication data of one interval as that transmitted to other game apparatuses 1. Thus, the effect image generation processing part 24 acquires the communication data of all game apparatuses 1 participating in the game. On the basis of the provided communication data, the effect image generation processing part 24 generates an image of speech balloon 103 as an effect image for each game apparatus 1.

Figure 5:
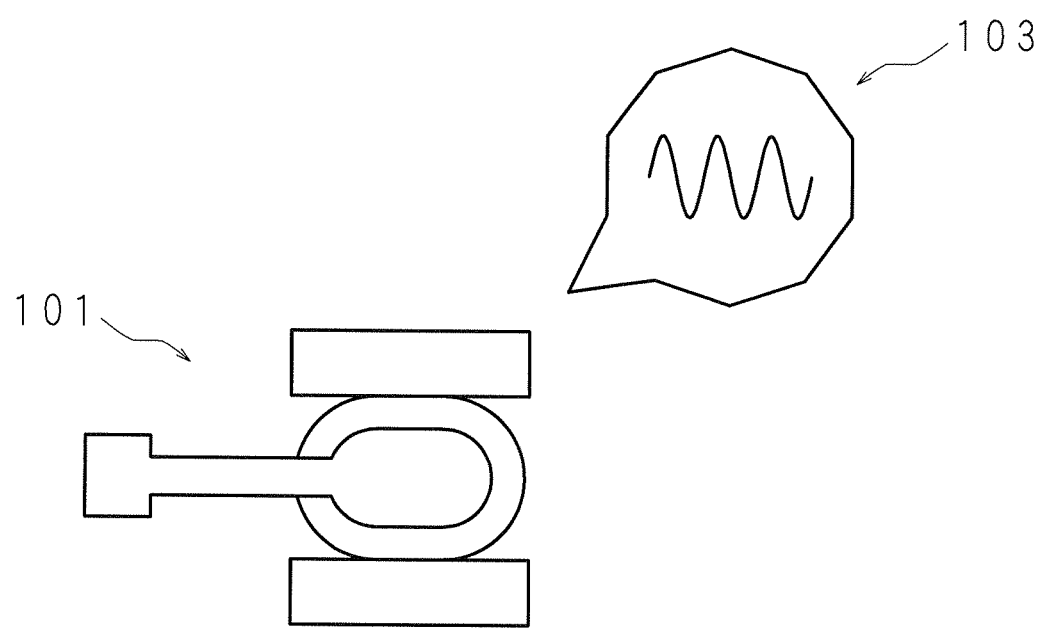
FIG. 5 shows an example non-limiting schematic diagram used for describing details of a generation method for a speech balloon.

As illustrated in FIG. 5, the speech balloon 103 generated by the effect image generation processing part 24 has a shape constructed from a base part of substantially triangle shape and from a part having a substantially decagon shape in which a waveform is drawn inside. The speech balloon 103 is displayed in the vicinity of the rear side of the corresponding tank object 101 relative to the direction of movement with the base part directed to the tank object 101. The illustrated speech balloon 103 is a polygon having eleven vertices. In the speech balloon 103, the positions of eight vertices other than the three vertices constituting the base part of substantially triangle shape vary in accordance with the difference values between the averages and the follow values in the intervals 1 to 8 generated as the communication data by the communication data generation processing part 22. The waveform inside of the speech balloon 103 similarly varies in accordance with the difference values. In the speech balloon 103 illustrated in FIG. 5, the part of substantially decagon shape is in a regular decagon shape. This shape is obtained when the eight difference values are all 0.

At each time that communication data from one of other game apparatuses 1 is provided from the communication processing part 23, the effect image generation processing part 24 updates the speech balloon 103. At each time that communication data concerning the own apparatus is provided from the communication data generation processing part 22, the effect image generation processing part 24 updates the speech balloon 103. Update of the speech balloon 103 is performed at each time that the difference value of one interval is provided as communication data. The effect image generation processing part 24 distinguishes which game apparatus 1 is related to the provided communication data. The effect image generation processing part 24 performs generation, update and the like of the speech balloon 103 for each game apparatus 1. The following description is given for a method of generation and update of the speech balloon 103 for one game apparatus 1.

On the basis of the received difference value of one interval, the effect image generation processing part 24 performs position change for one of the eight vertices of the speech balloon 103. As described above, the difference value in the communication data is transmitted in a given order like interval 1→interval 2→ . . . →interval 8→interval 1. In place of an approach that the positions of adjacent ones of the eight vertices of the speech balloon 103 are changed sequentially in, for example, a clockwise order or a counterclockwise order, the effect image generation processing part 24 changes the vertex positions without causing unevenness.

Figure 6:
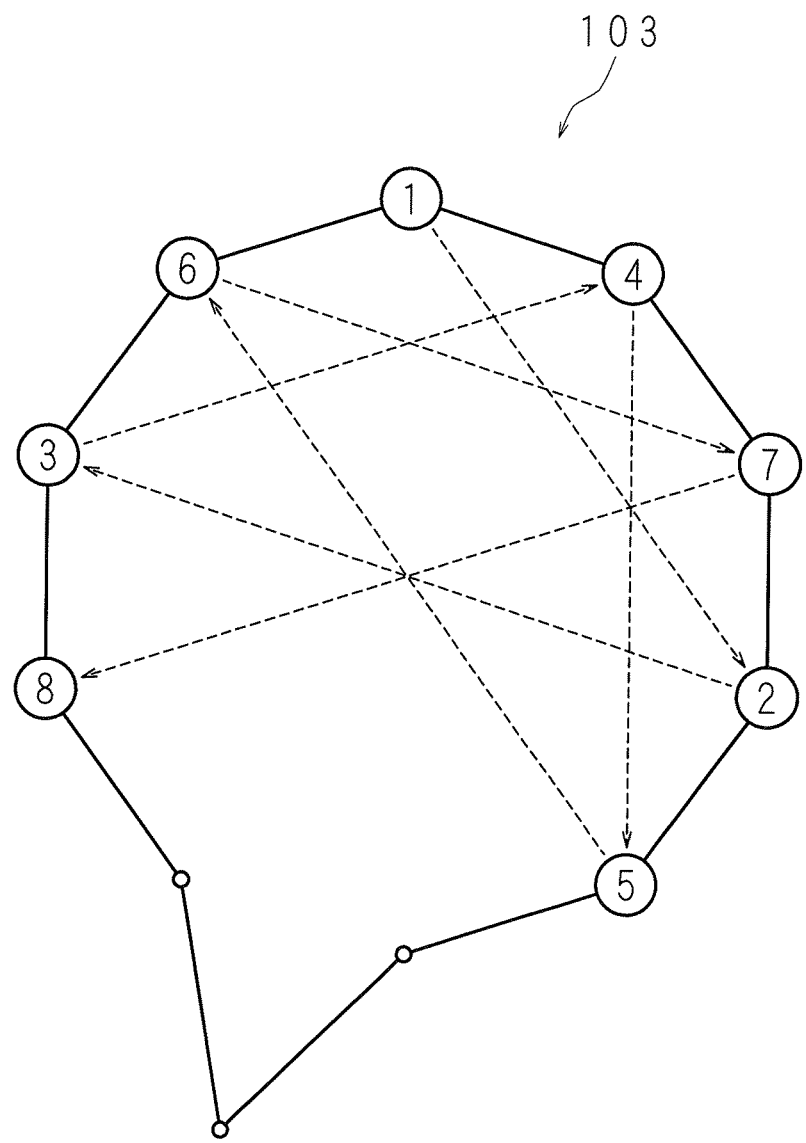
FIG. 6 shows an example non-limiting schematic diagram used for describing details of a generation method for a speech balloon.

In FIG. 6, numbers 1 to 8 are assigned respectively to eight vertices of the speech balloon 103 whose positions vary. At each time that the difference value of one interval is provided, the effect image generation processing part 24 changes a vertex position in accordance with the difference value in the order of numbering illustrated in the figure. For example, the correspondence relation between the intervals 1 to 8 and the vertices 1 to 8 may be one to one. That is, the position of the vertex 1 may be determined in accordance with the difference value of the interval 1, the position of the vertex 2 may be determined in accordance with the difference value of the interval 2, . . . , and the position of the vertex 8 may be determined in accordance with the difference value of the interval 8. In this case, the communication data transmitted and received between the game apparatuses 1 may contain, together with the difference value of each interval, header information indicating which interval this difference value is related to. Alternatively, for example, regardless of which interval the provided difference value is related to, the effect image generation processing part 24 may change the position in the order of vertices 1 and 2, . . . , and 8 at each time that a difference value is provided.

Figure 7A:
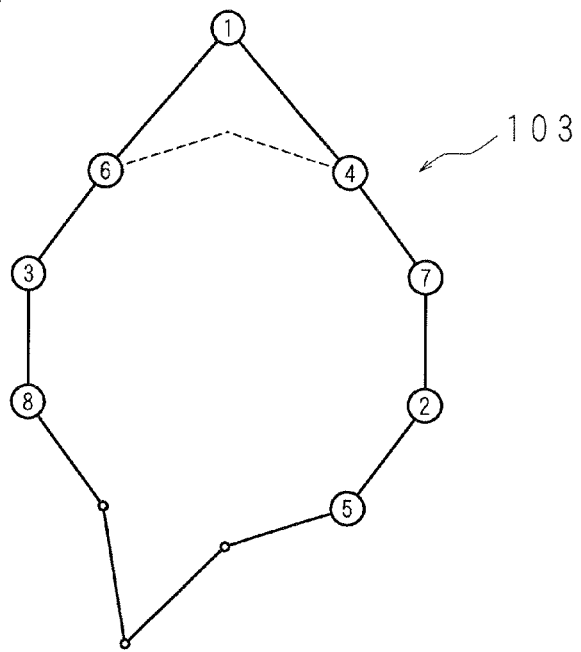
FIG. 7A shows an example non-limiting schematic diagram used for describing details of a generation method for a speech balloon.
Figure 7B:
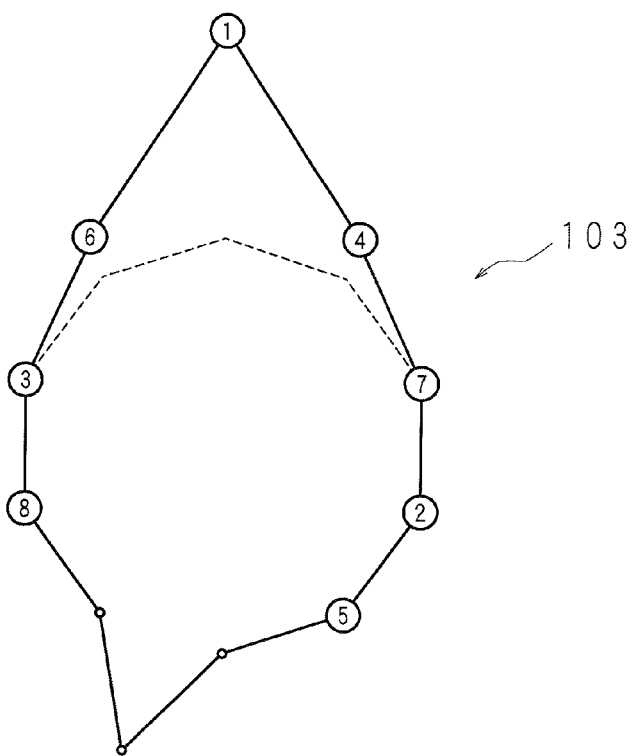
FIG. 7B shows an example non-limiting schematic diagram used for describing details of a generation method for a speech balloon.

FIGS. 7A and 7B illustrate examples of changing the position of a vertex of the speech balloon 103. For example, in accordance with the difference value concerning the communication data provided first, the effect image generation processing part 24 changes the position of the vertex 1 of the speech balloon 103. In the example illustrated in FIG. 7A, the effect image generation processing part 24 moves the vertex 1 by a distance in accordance with the difference value from the original position toward the outer side of the regular decagon. The original position of the vertex 1 indicates the position of the vertex 1 where the part of substantially decagon shape of the speech balloon 103 forms a regular decagon. Here, in a configuration that the communication data is allowed to contain a negative value, in accordance with the negative difference value, the effect image generation processing part 24 may move the vertex 1 toward the inner side of the regular decagon. Alternatively, in accordance with the negative difference value, the effect image generation processing part 24 may move the vertex 1 to the original position.

When a vertex is moved in accordance with the difference value, in some cases, in linkage with the moving of this vertex, the effect image generation processing part 24 moves the two adjacent vertices. In the example illustrated in FIG. 7B, together with the vertex 1 of the speech balloon 103, the effect image generation processing part 24 moves the two adjacent vertex 4 and vertex 6. When the vertex 1 is moved in accordance with the difference value concerning the interval 1, the effect image generation processing part 24 judges whether the difference between the distance of the moved position of the vertex 1 measured from the original position and the distance of the moved position of the adjacent vertex 4 measured from the original position exceeds a threshold value. When the distance difference exceeds the threshold value, the effect image generation processing part 24 moves the position of the vertex 4 such that the distance difference should be at or below the threshold value. Similar processing is performed also on the vertex 6.

When a vertex position of the speech balloon 103 is to be moved, the effect image generation processing part 24 also moves the positions of the two adjacent vertices such that the differences from the two adjacent vertices should be at or below the threshold value. This suppresses occurrence of a situation that the speech balloon 103 has an excessively distorted shape. Here, in the case of the vertex 5 or the vertex 8 of the speech balloon 103, the effect image generation processing part 24 moves the vertex 2 or the vertex 3 alone serving as an adjacent vertex on one side, and does not move the vertices constituting the base part of the speech balloon 103.

Figure 8:
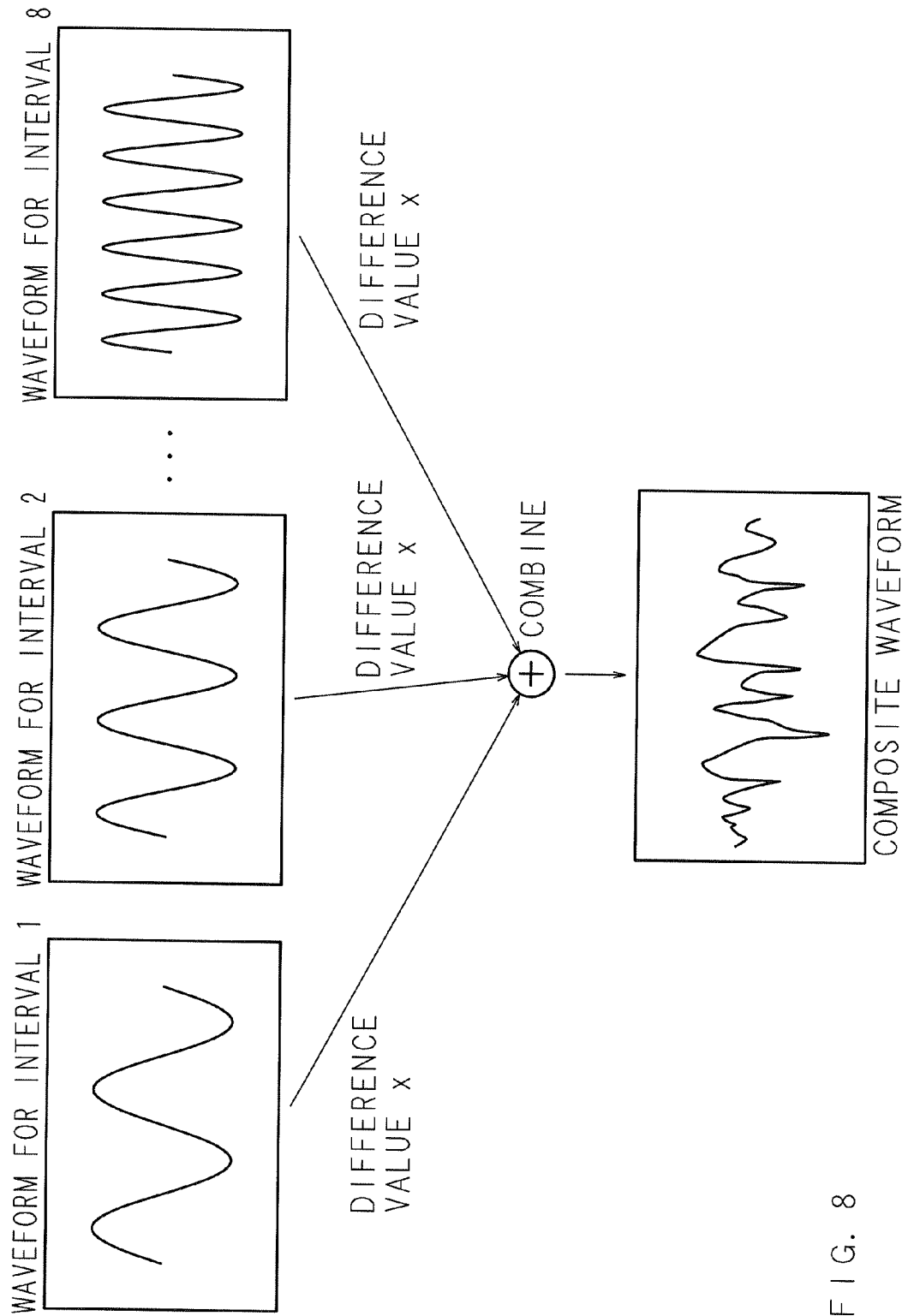
FIG. 8 shows an example non-limiting schematic diagram used for describing details of a generation method for a speech balloon.

The effect image generation processing part 24 generates a waveform image to be displayed in the speech balloon 103. FIG. 8 illustrates outlines of waveform generation. In the secondary storage part 14 or the recording medium 7 of the game apparatus 1, eight pieces of waveform pattern data for waveform image generation are stored together with the game program 9. The waveform pattern data for waveform image generation is illustrated as a waveform for interval 1 to a waveform for interval 8 in the upper part of FIG. 8. For example, the waveform pattern data for waveform image generation may be provided as image data. Alternatively, the waveform pattern data for waveform image generation may be provided as a set of discrete amplitude values. The waveform pattern data for waveform image generation may be provided as a mathematical expression using a trigonometric function and the like. The waveform pattern data for waveform image generation may be of other configurations.

On the basis of the difference values concerning the intervals 1 to 8 and the waveform for interval 1 to the waveform for interval 8 described above, the effect image generation processing part 24 generates a waveform image to be displayed in the speech balloon 103. For the interval 1, the effect image generation processing part 24 generates a waveform obtained by multiplying by the difference value the amplitude of the waveform of the interval 1. Similarly, for each of the intervals 2 to 8, the effect image generation processing part 24 generates a waveform obtained by multiplying the corresponding waveform amplitude by the difference value. The effect image generation processing part 24 is allowed to generate eight waveforms, and combines the generated eight waveforms. The effect image generation processing part 24 provides a speech balloon 103 containing this composite waveform inside, as an effect image to the display processing part 26.

The effect image generation processing part 24 generates the speech balloon 103 for each game apparatus 1. At each time that communication data is provided from each game apparatus 1, the effect image generation processing part 24 changes the vertex positions and combines the waveforms so as to update the speech balloon 103. The display processing part 26 displays each speech balloon 103 generated by the effect image generation processing part 24, in the vicinity of the corresponding tank object 101.

Figure 9:
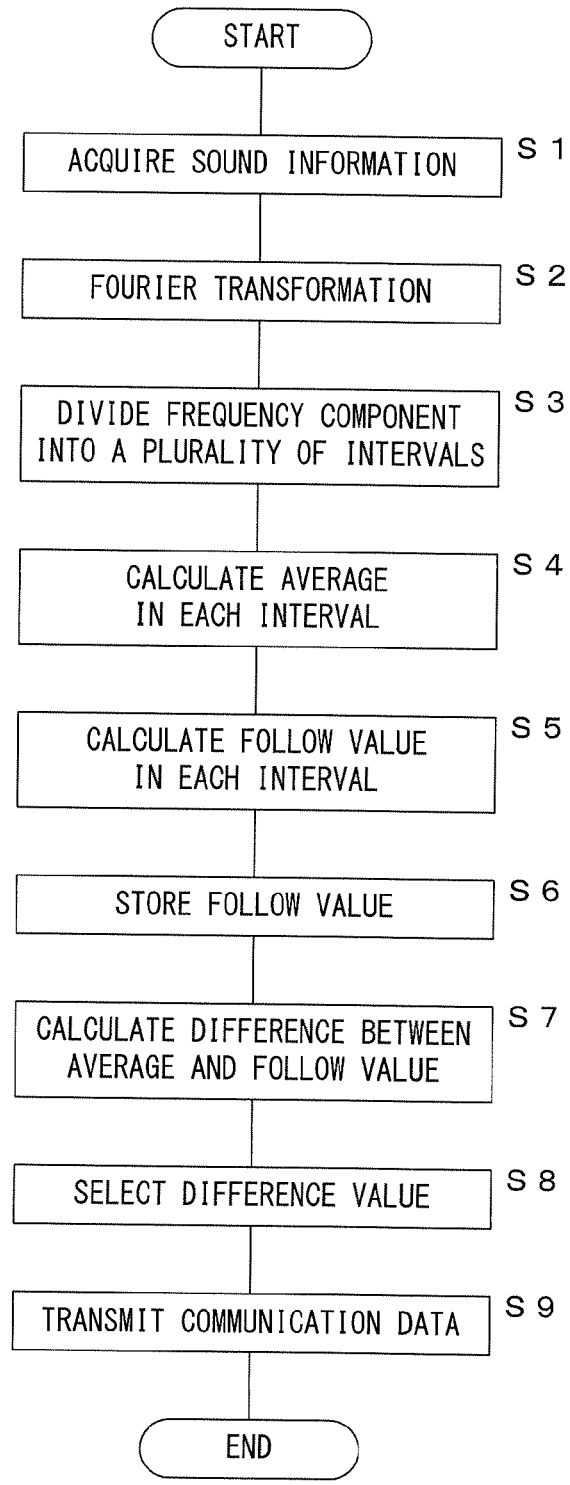
FIG. 9 shows an example non-limiting flow chart illustrating a procedure of communication data generation processing performed by a game apparatus.

FIG. 9 is a flow chart illustrating a procedure of communication data generation processing performed by the game apparatus 1. In the processing part 10 of the game apparatus 1, the sound information acquisition processing part 21 performs sampling on the sound input from the microphone 17 so that sound information is acquired (step S1). The communication data generation processing part 22 of the processing part 10 performs Fourier transformation on the sound information acquired by the sound information acquisition processing part 21 (step S2). The communication data generation processing part 22 transforms the sound information provided as amplitude-to-time characteristics, into frequency components expressed as amplitude-to-frequency characteristics. FIG. 9 describes a procedure that the processing of sound information acquisition by the sound information acquisition processing part 21 and the processing of Fourier transformation and the like by the communication data generation processing part 22 are performed sequentially. However, these pieces of processing may be performed in parallel to each other.

The communication data generation processing part 22 of the processing part 10 divides the frequency components obtained by Fourier transformation into a plurality of intervals of given frequency bands (step S3). The communication data generation processing part 22 calculates the average of the amplitude in each interval (step S4). The communication data generation processing part 22 calculates a follow value in each interval (step S5). At that time, the communication data generation processing part 22 increases or decreases the preceding follow value by a given amount in a direction of causing the follow value to approach the present average, and thereby calculates the present follow value. For the next and subsequent processing, the communication data generation processing part 22 stores the calculated follow value into the primary storage part 13 or the secondary storage part 14 (step S6). The communication data generation processing part 22 calculates for each interval the difference between the calculated average and the calculated follow value (step S7).

Among the plurality of difference values calculated for each interval, the communication data generation processing part 22 of the processing part 10 selects the difference value of one interval serving as an object of transmission to other game apparatuses 1 (step S8). The processing part 10 provides the difference value of one interval selected by the communication data generation processing part 22 as communication data to the communication processing part 23. The communication processing part 23 transmits the communication data to other game apparatuses 1 participating in the game (step S9). Here, during the time that the present game is ongoing, the processing part 10 repeats the processing of steps S1 to S9.

Figure 10:
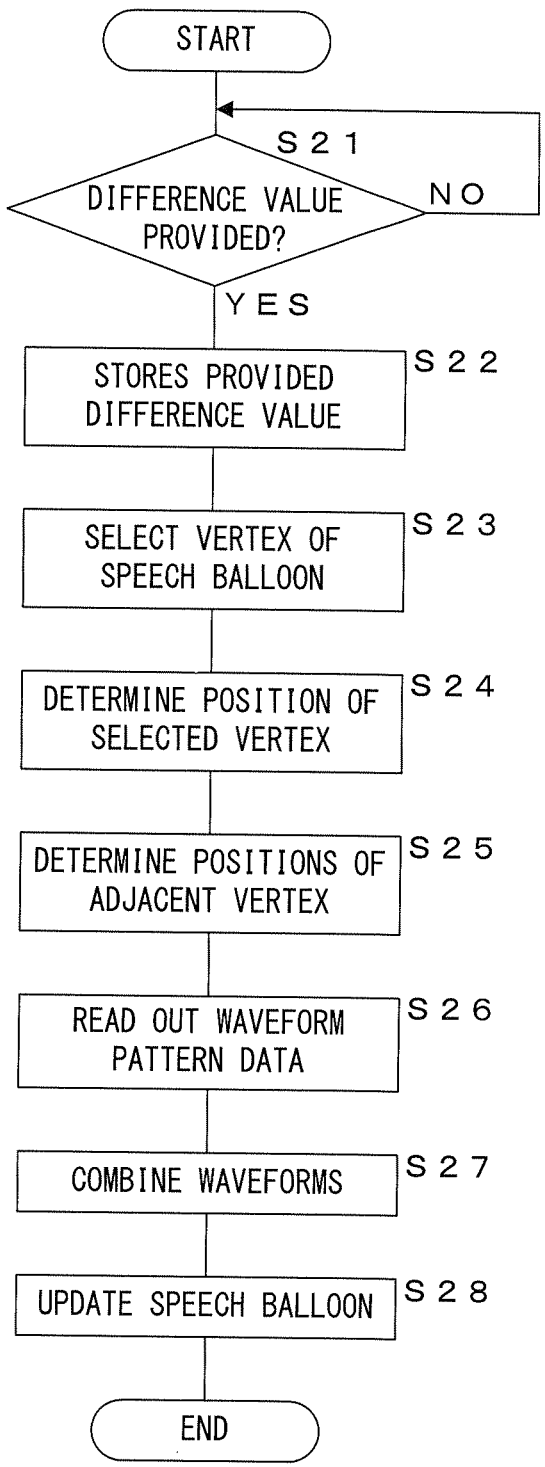
FIG. 10 shows an example non-limiting flow chart illustrating a procedure of display processing for a speech balloon performed by a game apparatus.

FIG. 10 is a flow chart illustrating a procedure of display processing for the speech balloon 103 performed by the game apparatus 1. The processing part 10 of the game apparatus 1 performs the processing illustrated in FIG. 10 individually for each tank object 101. That is, the processing part 10 performs the illustrated processing for each game apparatus 1 or each player participating in the game. In the processing part 10, when communication data from one of other game apparatuses 1 is received by the communication processing part 23, the difference value concerning the communication data is provided to the effect image generation processing part 24. In the processing part 10, when the communication data generation processing part 22 has generated communication data concerning the own apparatus, the difference value concerning the communication data is provided to the effect image generation processing part 24. The effect image generation processing part 24 of the processing part 10 judges whether the difference value has been provided from the communication processing part 23 or the communication data generation processing part 22 (step S21). When the difference value is not yet provided (S21: NO), the effect image generation processing part 24 waits until the difference value is provided thereto.

When the difference value has been provided (S21: YES), the effect image generation processing part 24 of the processing part 10 stores the provided difference value into the primary storage part 13 or the secondary storage part 14 (step S22). The effect image generation processing part 24 selects a vertex of the speech balloon 103 whose position is to be changed in accordance with the provided difference value (step S23). Selection of the vertex may be performed in accordance with, for example, an interval the provided difference value is related to, or the order of the difference values being provided. The effect image generation processing part 24 determines the position of the selected vertex in accordance with the difference value (step S24).

The effect image generation processing part 24 of the processing part 10 determines the positions of the two vertices adjacent to the vertex selected at step S23 (step S25). At that time, depending on a situation whether the difference between the distance of the selected vertex measured from the original position and the distance of each adjacent vertex measured from the original position exceeds a threshold value, the effect image generation processing part 24 judges whether the adjacent vertex needs to be moved. When the adjacent vertex needs to be moved, the effect image generation processing part 24 determines the position of each adjacent vertex such that the difference between the distance of the selected vertex measured from the original position and the distance of the adjacent vertex measured from the original position should be at or below the threshold value.

The effect image generation processing part 24 of the processing part 10 reads out the waveform pattern data for waveform image generation corresponding to each interval (step S26). The effect image generation processing part 24 multiplies the amplitude of the waveform pattern data for waveform image generation for each interval, by the difference value corresponding to the interval. The effect image generation processing part 24 combines the waveforms of the waveform pattern data for waveform image generation obtained by multiplication by the difference values (step S27). The effect image generation processing part 24 provides to the display processing part 26 the speech balloon 103 containing inside the composite waveform obtained at step S27. In the processing part 10, the display processing part 26 performs update of the display of the game screen corresponding to the speech balloon 103 provided from the effect image generation processing part 24 (step S28). Then, the processing is finished. Here, during the time that the present game is ongoing, the processing part 10 repeats the processing of steps S21 to S28.

In the game system according to the present embodiment described above, the plurality of game apparatuses 1 perform communication with each other through the network 5 so as to perform processing concerning a game participated by a plurality of players. Each game apparatus 1 acquires sound information of the surroundings through the microphone 17. On the basis of the acquired sound information, each game apparatus 1 generates communication data having a small data amount, and then transmits the obtained data to other game apparatuses 1. The game apparatus 1 having received the communication data generates an image on the basis of the communication data. The game apparatus 1 displays the generated image in a manner of being related to a player participating in the game. Each game apparatus 1 does not transmit the acquired sound information itself. Thus, in comparison with a configuration that the sound information acquired through the microphone 17 is transmitted and received between the game apparatuses 1, in the game system according to the present embodiment, the amount of communication data may be reduced. In the game system according to the present embodiment, the amount of information processing in each game apparatus 1 may also be reduced. Each game apparatus 1 generates and displays an image on the basis of the received communication data. Thus, even players who do not understand the same language are allowed to enjoy the game while feeling the presence of other players through the network.

The communication data generated by the game apparatus 1 has a numerical value corresponding to a change in the sound information. The communication data has a large numerical value when a change in the sound information is large. Thus, the game apparatus 1 having received this communication data is allowed to generate and display an image corresponding to a change in the sound information of the surroundings of other game apparatuses 1.

In the game apparatus 1, the operation part 16 accepts an operation of a player. The game apparatus 1 displays the tank object 101 serving as an operation target onto the game screen. At that time, the game apparatus 1 displays an image generated on the basis of the communication data from each game apparatus 1, in a manner of being related to each tank object 101. The game apparatus 1 displays the image based on the communication data, in the vicinity of the tank object 101. The game apparatus 1 displays the image, for example, in the vicinity of the rear side of the tank object 101 relative to the direction of movement. Thus, the image based on the communication data is allowed to be displayed in a manner of being related to each player participating in the game. Further, the sound in the surroundings of each player may be expressed as an image.

The game apparatus 1 transforms the sound information acquired through the microphone 17 into information of frequency components by Fourier transformation. The game apparatus 1 divides the transformed frequency components into a plurality of frequency bands. Then, the game apparatus 1 generates communication data for each frequency band interval. For example, the communication data may be the difference value between the average of the amplitude of each interval and a follow value that varies following the present average. By virtue of this, the communication data has a large value when a change in the sound information is large. When an image for display is generated on the basis of this communication data, a larger image may be displayed when a change in the sound information is large. When the follow value is employed, a change in the speech balloon 103 displayed by the game apparatus 1 becomes smooth.

The game apparatus 1 does not transmit to other game apparatuses 1 all of the plural pieces of communication data generated for each interval, and selects one from the plural pieces of communication data and then transmits the selected one to other game apparatuses 1. This reduces the amount of data transmitted and received between the plurality of game apparatuses 1. The game apparatus 1 selects an interval in a given order and then transmits the communication data. Thus, on the basis of the order of receiving, the game apparatus 1 having received the communication data is allowed to judge which interval the communication data is related to.

The game apparatus 1 receives plural pieces of communication data generated for a plurality of intervals. On the basis of the plural pieces of received communication data, the game apparatus 1 generates and displays an image expressing the change in the amplitude of the frequency component in each interval. For example, the game apparatus 1 is allowed to generate and display a polygonal image of the speech balloon 103 having a plurality of vertices each assigned to one interval. In accordance with the difference value provided as the communication data of each interval, the game apparatus 1 changes the position of each vertex of the speech balloon 103. This permits displaying of an image that varies in accordance with a change in the sound information acquired by each game apparatus 1.

The game apparatus 1 stores plural pieces of waveform pattern data for waveform image generation each assigned to each frequency band interval. In accordance with the communication data of each provided interval, the game apparatus 1 combines the plural pieces of waveform pattern data for waveform image generation and then displays the composite waveform inside the speech balloon 103. By virtue of this, the change in the sound information acquired by each game apparatus 1 may clearly be reported to the player.

The speech balloon 103 generated and displayed on the basis of sound information by each game apparatus 1 is an image unrelated to the progress of the game in which a plurality of tank objects 101 perform a battle against each other. That is, the presence or absence of display of the speech balloon 103, the displayed contents, and the like do not affect the victory or defeat in the game, the success or failure of the attack or the like.

Here, in the present embodiment, the game played by the game apparatuses 1 according to the execution of the game program 9 has been such a game that a plurality of tank objects 101 attack each other. However, employable games are not limited to this. For example, a game may be employed that objects such as airplanes, ships, robots, persons and animals attack each other. Alternatively, in place of a game that a plurality of objects attack each other, a game may be employed that a plurality of objects cooperate with each other.

A configuration has been employed that when the processing part 10 of the game apparatus 1 executes the game program 9, the processing part 10 operates as software-based functional blocks having the functions of the sound information acquisition processing part 21 to the display processing part 26. However, employable configurations are not limited to this. For example, a part of the functions of the sound information acquisition processing part 21 to the display processing part 26 may be provided as a function of the OS (Operating System). A configuration has been employed that the game apparatus 1 includes the microphone 17. However, employable configurations are not limited to this. For example, a configuration may be employed that the microphone 17 is attachable to and detachable from the game apparatus 1. The game apparatus 1 has been of portable type. However, employable configurations are not limited to this. For example, a game apparatus of floor-standing type may be employed. Further, the game apparatus 1 need not be a dedicated apparatus for games, and may be a communication terminal device of diverse kind such as a PC (Personal Computer) or a smart phone capable of executing the game program 9.

A configuration has been employed that a plurality of game apparatuses 1 perform communication directly with each other through the network 5. However, employable configurations are not limited to this. For example, a configuration may be employed that each game apparatus 1 transmits information to a server apparatus and then the server apparatus distributes the information to each game apparatus 1. In this configuration, a part or the entirety of the processing performed by the sound information acquisition processing part 21 to the display processing part 26 may be performed by the server apparatus.

All of the plurality of game apparatuses 1 participating in the game through the network 5 need not be of the same-type game apparatuses 1. For example, various kinds of game apparatuses may be employed in a mixed manner like game apparatuses of floor-standing type, portable game apparatuses, PCs in which the game program is installed, and smart phones in which the game application is installed.

In the game system according to the present embodiment, a configuration has been employed that each game apparatus 1 acquires sound information as environmental information through the microphone 17. However, the sound information is not limited to environmental information. For example, a camera may be mounted on the game apparatus 1. Then, on the basis of the image information obtained by image pick-up through the camera, the game apparatus may generate communication data, for example, by extracting an edge in the image and thereby quantifying the position change of the edge or alternatively by performing facial recognition in the image and thereby quantifying the position change of the face. In this case, for example, the game apparatus 1 having received the communication data may, on the basis of the communication data, perform image processing of changing the orientation of the face of a human-shaped object operated by the player or alternatively of changing the facial expression. For example, the game apparatus 1 may include an acceleration sensor. Then, the game apparatus 1 may quantify a change in the acceleration applied on the game apparatus 1 and then adopt the data as communication data. In this case, for example, the game apparatus 1 having received the communication data may perform image processing of, on the basis of the communication data, vibrating a part or the entirety of the object operated by the player. Alternatively, the magnitude of the acceleration applied on the game apparatus 1 may be interpreted as indicating the degree of excitement of the player. Thus, for example, on the basis of the communication data, the game apparatus 1 is allowed to perform image processing of changing the facial expression of the human-shaped object operated by the player. For example, a configuration may be employed that the game apparatus 1 acquires, as environmental information, temperature information of the surroundings obtained through a temperature sensor, illuminance information of the surroundings obtained through an illuminance sensor, or position information obtained through a GPS (Global Positioning System).

A configuration has been employed that the game apparatus 1 transmits and receives as the communication data the difference value between the average and the follow value. However, employable configurations are not limited to this. For example, the game apparatus 1 may adopt as communication data the difference value between the preceding average and the present average. For example, the game apparatus 1 may adopt as communication data the present average. In place of the average of each interval, the game apparatus 1 may use another value such as the maximum or the minimum of the amplitude of each interval. The follow value may be regarded as following such a value.

A configuration has been employed that the game apparatus 1 transforms the acquired sound information into frequency components by Fourier transformation, and then generates communication data corresponding to the frequency components. However, employable configurations are not limited to this. For example, the game apparatus 1 may calculate any characteristic quantity from the environmental information by a method other than Fourier transformation, and then generate communication data in accordance with the calculated characteristic quantity.

The game apparatus 1 need not always display the speech balloon 103 in correspondence to each tank object 101. In the game apparatus 1, the speech balloon 103 may be not displayed when necessary. For example, a configuration may be employed that when a change in the sound information is large, the game apparatus 1 displays the speech balloon 103 and that when the change is small, the game apparatus 1 does not display the speech balloon 103. In this case, when the total value of the difference values of each interval concerning the received communication data exceeds a given value, the game apparatus 1 displays the speech balloon 103. Then, when the total value of the difference values does not exceed the given value, the game apparatus 1 does not display the speech balloon 103.

A configuration has been employed that in accordance with the provided communication data, the game apparatus 1 displays the speech balloon 103 of polygon shape in the vicinity of the tank object 101. However, employable configurations are not limited to this. For example, the game apparatus 1 may display the speech balloon constructed from a curved line. The game apparatus 1 may display an image other than a speech balloon. For example, in place of displaying the speech balloon 103, the game apparatus 1 may display a composite waveform obtained by combining the waveform pattern data for waveform image generation of the individual intervals. For example, in place of displaying the image in the vicinity of the object operated by the player, the game apparatus 1 may change the shape, the color or the like of the object in accordance with the communication data.

(Modification 1)

In the game apparatus 1 according to Modification 1, the communication data generation processing part 22 generates communication data allowed to have a positive or a negative value, and then transmits the communication data to other game apparatuses 1. The communication data generation processing part 22 adopts as the communication data the difference value between the average and the follow value in each interval regardless of whether the difference value is positive or negative. When the communication data is of a positive value, as illustrated in FIGS. 7A and 7B, the game apparatus 1 having received the communication data moves the vertex position of the speech balloon 103 toward the outer side of the regular decagon. In contrast, when the communication data is of a negative value, the game apparatus 1 moves the vertex position of the speech balloon 103 toward the inner side of the regular decagon. By virtue of this, the game apparatus 1 is allowed to display the speech balloon 103 having a concave shape.

(Modification 2)

In the game apparatus 1 according to Modification 2, in place of displaying the speech balloon 103 in accordance with the difference value of the received communication data, image processing of changing the color of the tank object 101 is performed. For example, in the case of the tank object 101 colored in red, the effect image generation processing part 24 of the game apparatus 1 according to Modification 2 generates the tank object 101 in deep red when the difference value of the communication data is large. When the difference value is small, the effect image generation processing part 24 generates the tank object 101 in light red. The display processing part 26 displays the game screen by using the tank object 101 generated by the effect image generation processing part 24. Here, the game apparatus 1 may change the shape of the tank object 101 in accordance with the difference value of the communication data.

In the present specification, it is to be understood that description of an element expressed in a singular form provided with an article "a" or "an" does not exclude a configuration employing a plurality of elements each corresponding to the mentioned single element.

The game apparatus 1 according to the present embodiment generates communication data on the basis of the acquired environmental information, and then transmits and receives the communication data. This reduces the amount of data transmitted and received between the plurality of apparatuses. Further, the amount of information processing in each apparatus is reduced. The game apparatus 1 generates and displays a image on the basis of the received communication data. Thus, even players who do not understand the same language are allowed to enjoy the game while feeling the presence of other players through the network.

What is claimed is:

1. A game system comprising a plurality of communication terminal devices transmitting and receiving information and each of the communication terminal being configured to execute a game, wherein each of the communication terminal devices comprises:
    a display; and
    a processing system, including at least one processor, the processing system coupled to the display and being configured to:
        display, on the display, a plurality of player objects, each of the displayed player objects corresponding to a different communication terminal device participating in the game;
        during execution of the game, acquire environmental information of surroundings of the communication terminal device;
        transform the acquired environmental information into information of frequency components representing the acquired environmental information in a frequency domain;
        generate communication data indicating a change in an amplitude of the information of the frequency components representing the acquired environmental information in the frequency domain, wherein data amount of the generated communication data is smaller than data amount of the acquired environmental information;
        transmit the generated communication data to one or more of the plurality of communication terminal devices;
        receive, from another communication terminal device corresponding to one of the displayed player objects, communication data indicating a change in an amplitude of a frequency component representing environmental information, captured by the another communication terminal device, in the frequency domain;
        generate an image based on the change of the amplitude of the frequency component indicated in the received communication data; and
        display, on the display, the generated image in a manner of being related to the displayed player object corresponding to the another communication terminal device participating in the game.

2. The game system according to claim 1, wherein the generated communication data has a different data format from the acquired environmental information.

3. The game system according to claim 1, wherein acquiring environmental information includes acquiring sound information of surroundings of the communication terminal device.

4. The game system according to claim 3, wherein the communication data is generated on a basis of frequency components of the acquired sound information.

5. The game system according to claim 4, wherein
    transforming the acquired environmental information includes transforming the acquired sound information into the information of frequency components, and
    the transformed information of frequency components are divided into a plurality of frequency bands and the communication data is generated for each frequency band.

6. The game system according to claim 5, wherein the communication data is generated in accordance with an average of the frequency component in each frequency band.

7. The game system according to claim 6, wherein the processing system is configured to calculate a follow value following the average and, on a basis of the average and the follow value, generate the communication data.

8. The game system according to claim 7, wherein the processing system is configured to adopt as the communication data a difference between the average and the follow value.

9. The game system according to claim 5, wherein the processing system is configured to calculate a follow value following a change in amplitude of the frequency component in each frequency band and, in accordance with the follow value, generate the communication data.

10. The game system according to claim 5, wherein plural pieces of communication data are transmitted for individual frequency bands.

11. The game system according to claim 10, wherein the plural pieces of communication data for individual frequency bands are transmitted in a given order.

12. The game system according to claim 5, wherein generating the image includes generating an image indicating a change in amplitude of the frequency component in each frequency band on a basis of the received plural pieces of communication data for individual frequency bands from the another communication terminal device.

13. The game system according to claim 12, wherein the processing system is configured to:
    generate a polygonal figure having a plurality of vertices each related to one frequency band, and
    a position of each vertex is determined on a basis of the received communication data.

14. The game system according to claim 13, wherein
    each of the communication terminal devices further includes a storage configured to store plural pieces of waveform data related to individual frequency bands, and wherein
    on a basis of plural pieces of received communication data for individual frequency bands, an image is generated in which a composite waveform obtained by combining waveforms concerning the plural pieces of waveform data stored in the storage is surrounded by the polygonal figure.

15. The game system according to claim 12, wherein
    each of the communication terminal devices further includes a storage configured to store plural pieces of waveform data related to individual frequency bands, and wherein
    on a basis of plural pieces of communication data for individual frequency bands, an image is generated of a composite waveform obtained by combining waveforms concerning the plural pieces of waveform data stored in the storage.

16. The game system according to claim 1, wherein the generated communication data is data having a numerical value corresponding to a change in the acquired environmental information.

17. The game system according to claim 16, wherein the generated image is displayed on the display when the numerical value exceeds a given value.

18. The game system according to claim 1, wherein the generated communication data is data having a numerical value corresponding to the change in the amplitude of the frequency component representing the acquired environmental information in the frequency domain and the numerical value is increased when the change in the amplitude of the frequency component representing the acquired environmental information in the frequency domain is increased.

19. The game system according to claim 1, wherein
the processing system is further configured to accept an operation from at least one of the communication terminal devices, and
based on the accepted operation, move the displayed player object corresponding to the communication terminal device from which the operation is accepted.

20. The game system according to claim 19, wherein the generated image is displayed in the vicinity of the player object.

21. The game system according to claim 1, wherein the processing system is further configured to:
accept an operation from an operation device coupled to a communication terminal device,
on a basis of the received communication data, generate an image of a player object corresponding the communication terminal device from which operation is accepted, and
display, on the display, the generated image of the player object.

22. The game system according to claim 1, wherein each of the communication terminal devices does not transmit the acquired environmental information.

23. The game system according to claim 1, wherein the generated image is an image unrelated to progress of the game.

24. A game apparatus transmitting and receiving information to and from another apparatus and executing a game participated by a plurality of players, the game apparatus comprising a processing system, including at least one processor, the processing system being configured to:
display, on the display, a player object corresponding to the game apparatus and a player object corresponding to the another apparatus participating in the game;
during execution of the game acquire environmental information of surroundings of the game apparatus;
transform the acquired environmental information into information of frequency components representing the acquired environmental information in a frequency domain;
generate communication data indicating a change in an amplitude of a frequency component representing the acquired environmental information in the frequency domain, wherein data amount of the communication data is smaller than data amount of the acquired environmental information;
transmit the generated communication data to the another apparatus;
receive, from the another apparatus, communication data indicating a change in an amplitude of a frequency component representing environmental information, captured by the another apparatus, in the frequency domain;
generate an image based on the change of the amplitude of the frequency component indicated in the received communication data; and
display, on a display associated with the game apparatus, the generated image in a manner of being related to the displayed player object corresponding to the another apparatus participating in the game.

25. The game apparatus according to claim 24, wherein acquire environmental information includes acquiring sound information;
transforming the acquired environmental information includes transforming the acquired sound information into the information of frequency components and dividing the frequency components into a plurality of frequency component bands; and
the communication data indicates a change in the amplitude of the frequency component for each frequency component band.

26. A game processing method performed by a game apparatus configured to execute a game and including a display, the method comprising:
displaying, on the display, a plurality of player objects, each of the displayed player objects corresponding to a different game apparatus participating in the game;
during execution of the game, acquiring environmental information of surroundings of the game apparatus;
transforming the acquired environmental information into information of frequency components representing the acquired environmental information in a frequency domain;
generating communication data indicating a change in an amplitude of a frequency component representing the acquired environmental information in the frequency domain, wherein data amount of the communication data is smaller than data amount of the acquired environmental information,
transmitting the generated communication data to one or more communication devices;
receiving, from another name apparatus corresponding to one of the displayed player objects, communication data indicating a change in an amplitude of a frequency component representing environmental information, captured by the another game apparatus, in the frequency domain;
generating an image on a basis of the change of the amplitude of the frequency component indicated in the received communication data; and
displaying, on the display, the generated image in a manner of being related to the displayed player object corresponding to the another game apparatus participating in the game.

27. A non-transitory recording medium recording therein a game program causing a computer of a game apparatus to transmit and receive information to and from another game apparatus, wherein the game program, when executed by the computer, causes the computer to:
display, on a display, a player object corresponding to the game apparatus and a player object corresponding to the another apparatus participating in the game,
during execution of the game program, acquire environmental information concerning a surrounding environment of the game apparatus;
transform the acquired environmental information into information of frequency components representing the acquired environmental information in a frequency domain;
generate communication data indicating a change in an amplitude of a frequency component representing the acquired environmental information in the frequency domain, wherein data amount of the communication data is smaller than data amount of the acquired environmental information;
transmit the generated communication data to another game apparatus;
receive, from the another game apparatus, communication data indicating a change in an amplitude of a frequency component representing environmental information, captured by the another game apparatus, in the frequency domain;

generate an image based on the change of the amplitude of the frequency component indicated in received communication data; and display, on the display, the generated image in a manner of being related to the displayed player object corresponding to the another game apparatus participating in the game.

* * * * *